(12) United States Patent
Arvis et al.

(10) Patent No.: US 10,445,868 B2
(45) Date of Patent: Oct. 15, 2019

(54) METHOD FOR DETECTING A DEFECT ON A SURFACE OF A TIRE

(71) Applicants: COMPAGNIE GENERALE DES ESTABLISSEMENTS MICHELIN, Clermont-Ferrand (FR); Michelin Recherche et Technique S.A., Granges-Paccot (CH)

(72) Inventors: Vincent Arvis, Clermont-Ferrand (FR); Dominique Jeulin, Clermont-Ferrand (FR); Michel Bilodeau, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 189 days.

(21) Appl. No.: 15/528,956

(22) PCT Filed: Dec. 1, 2015

(86) PCT No.: PCT/FR2015/053268
§ 371 (c)(1),
(2) Date: May 23, 2017

(87) PCT Pub. No.: WO2016/097520
PCT Pub. Date: Jun. 23, 2016

(65) Prior Publication Data
US 2017/0278234 A1  Sep. 28, 2017

(30) Foreign Application Priority Data
Dec. 15, 2014 (FR) ...................................... 14 62452

(51) Int. Cl.
G06K 9/00 (2006.01)
G06K 9/46 (2006.01)
(Continued)

(52) U.S. Cl.
CPC .............. G06T 7/0004 (2013.01); G06T 7/41 (2017.01); G06T 7/44 (2017.01)

(58) Field of Classification Search
USPC ................ 382/141, 104, 190, 266; 356/601; 702/34; 73/146
See application file for complete search history.

(56) References Cited

U.S. PATENT DOCUMENTS

| | | | |
|---|---|---|---|
| 6,539,789 B1* | 4/2003 | Kostka | G01B 11/25 73/146 |
| 7,012,701 B2* | 3/2006 | Hassler | G01B 11/25 356/601 |

(Continued)

FOREIGN PATENT DOCUMENTS

| | | |
|---|---|---|
| EP | 2 295 930 A1 | 3/2011 |
| FR | 2 974 219 A1 | 10/2012 |

(Continued)

OTHER PUBLICATIONS

Feb. 18, 2016 International Search Report and Written Opinion in International Patent Appln. No. PCT/FR2015/053268.

*Primary Examiner* — Kathleen Y Dulaney
(74) *Attorney, Agent, or Firm* — Venable LLP

(57) ABSTRACT

A method for detecting a defect on a surface of a tire includes automated steps of: calculating values of a gradient of a plurality of texture parameters from an image of the surface of the tire, determining an image of the gradient, and thresholding of the image of the gradient to obtain a thresholded image.

14 Claims, 1 Drawing Sheet

(51) Int. Cl.
*G06K 9/40* (2006.01)
*G01B 11/24* (2006.01)
*G01B 3/44* (2006.01)
*E01C 23/00* (2006.01)
*G06T 7/00* (2017.01)
*G06T 7/44* (2017.01)
*G06T 7/41* (2017.01)

(56) References Cited

U.S. PATENT DOCUMENTS

| | | | |
|---|---|---|---|
| 7,088,442 B2* | 8/2006 | Hassler | G01B 11/2522 356/237.1 |
| 8,260,048 B2* | 9/2012 | Jin | G06T 7/11 382/128 |
| 9,189,841 B2 | 11/2015 | Noyel et al. | G06T 7/0004 |
| 9,196,034 B2* | 11/2015 | Noyel | G06T 7/0004 |
| 9,230,337 B2* | 1/2016 | Zanella | G06T 5/005 |
| 2007/0160308 A1 | 7/2007 | Jones | G06K 9/0061 382/260 |
| 2011/0069323 A1* | 3/2011 | Takahashi | G01B 11/25 356/625 |
| 2011/0081087 A1* | 4/2011 | Moore | G06K 9/00711 382/199 |
| 2012/0020526 A1* | 1/2012 | Teti | G06T 7/0004 382/104 |
| 2012/0070071 A1* | 3/2012 | Rankin | G06K 9/00805 382/154 |
| 2012/0076419 A1* | 3/2012 | Kono | G06T 7/136 382/195 |
| 2012/0086566 A1* | 4/2012 | Carney | B29D 30/54 340/443 |
| 2013/0022288 A1* | 1/2013 | Sartor | G06T 5/002 382/266 |
| 2013/0051665 A1* | 2/2013 | Shinozaki | G06T 5/00 382/167 |
| 2013/0202156 A1* | 8/2013 | Joly | G01M 17/027 382/104 |
| 2013/0266189 A1* | 10/2013 | Vinciguerra | G06K 9/6207 382/104 |
| 2013/0266225 A1* | 10/2013 | Vinciguerra | G06K 9/6204 382/190 |
| 2014/0078320 A1* | 3/2014 | Hong | H04N 5/217 348/208.1 |
| 2014/0254912 A1 | 9/2014 | Noyel et al. | 382/141 |
| 2014/0270466 A1* | 9/2014 | Dam | G01M 17/027 382/141 |
| 2014/0293052 A1* | 10/2014 | Kuehnle | G06T 7/73 348/148 |
| 2014/0307941 A1* | 10/2014 | Zanella | G06T 5/002 382/141 |
| 2014/0314271 A1* | 10/2014 | Xu | G06K 9/00369 382/103 |
| 2014/0334667 A1* | 11/2014 | Eswara | G06K 9/00637 382/103 |
| 2015/0254829 A1* | 9/2015 | Araki | G01B 11/24 382/141 |

FOREIGN PATENT DOCUMENTS

FR 2 974 220 A1 10/2012
WO WO 2013/045594 A1 4/2013

* cited by examiner

METHOD FOR DETECTING A DEFECT ON A SURFACE OF A TIRE

FIELD OF THE INVENTION

The invention relates to methods for detecting a defect on a surface of a tire.

RELATED ART

There is a known method for automatically searching for defects present on a surface of a tire. In this method, two- or three-dimensional images of the surface are initially acquired by industrial vision techniques, using sensors. These images are then analyzed by automated means for locating any defects on the surface. For this purpose, the automated means analyze one or more texture parameters of the image, the aim being, on the one hand, to segment the image, in other words to separate the image into regions in which the texture parameter or parameters are different, and, on the other hand, to classify the image, in other words to match the segmented image or images with a set of images in a reference image base, with the aim of identifying any defects.

Separating the image into regions in which the texture parameters are different consists, for example but not exclusively, in separating the image into a region corresponding to a smooth surface, a region corresponding to a rough surface, and a region corresponding to a striated surface.

However, this method does not always yield satisfactory results, notably where the surface to be analyzed is an inner surface of the tire. This is because the surface has a repeated random pattern commonly known as "orange peel". Consequently, the appearance of a sound inner surface, free of defects, is itself random. It is therefore impossible to distinguish a sound region having an "orange peel" pattern from a region having a defect, so that the method described above is no longer applicable.

BRIEF DESCRIPTION OF EMBODIMENTS OF THE INVENTION

One object of the invention is to improve the method for detecting a defect on a surface of a tire.

For this purpose, a method is provided, according to the invention, for detecting a defect on a surface of a tire, in which automated means:
calculate values of a gradient of a plurality of texture parameters from an image of the tire surface,
determine an image of the gradient, and
threshold the image of the gradient, in order to obtain a thresholded image.

The concept of a texture gradient is explained below in the description, notably with the aid of examples.

This method may also be used to detect heterogeneities of texture in the image of the tire surface. These heterogeneities are always associated with defects. In other words, the regions of the image with a low gradient are homogeneous and free of defects, while the regions of the image with a high gradient exhibit heterogeneity which is characteristic of a defect. The thresholding of the gradient image facilitates the subsequent use of automated or human means to display the location of the defects in the image. The calculation of the value of a gradient of a plurality of texture parameters may also be used to refine the method, enabling it to detect the presence of defects on the surface more reliably than the method in which the values of a gradient are calculated from a single texture parameter.

Advantageously, the tire surface is an inner surface of the tire.

Because of the calculation of values of the texture gradient of the image of the surface, the method enables defects to be detected even on a surface having a repetitive random pattern.

Advantageously, the automated means acquire the image of the surface by laser triangulation.

This technique enables a very high-quality image of the surface to be obtained.

Advantageously, the automated means calculate the values of the gradient in a selection of pixels of a part of the image of the surface.

This reduces the number of calculations required to determine the image of the gradient, thereby reducing the time taken by the method.

Advantageously, the automated means calculate a grey level gradient in the image of the surface.

The grey level is a texture parameter of the image whose gradient values can easily be calculated.

Advantageously, the thresholding is performed by hysteresis.

This thresholding method is effective and simple to use.

The invention also provides for a computer program comprising coded instructions adapted to command the execution of a method as described above when it is executed on a computer.

The invention also provides for a computer-readable storage medium containing instructions which, when executed by a computer, cause this computer to execute one of the methods as described above.

The invention also provides for an installation for detecting a defect on a surface of a tire, comprising automated means adapted for:
calculating values of a texture gradient from an image of the tire surface,
determining an image of the gradient, and
thresholding the image of the gradient, in order to obtain a thresholded image.

Advantageously, the automated means are also adapted for acquiring the image of the tire surface.

BRIEF DESCRIPTION OF THE DRAWINGS

An embodiment of the invention will now be described with the aid of the attached drawings, in which.

DETAILED DESCRIPTION OF EMBODIMENTS OF THE INVENTION

Figure 1:
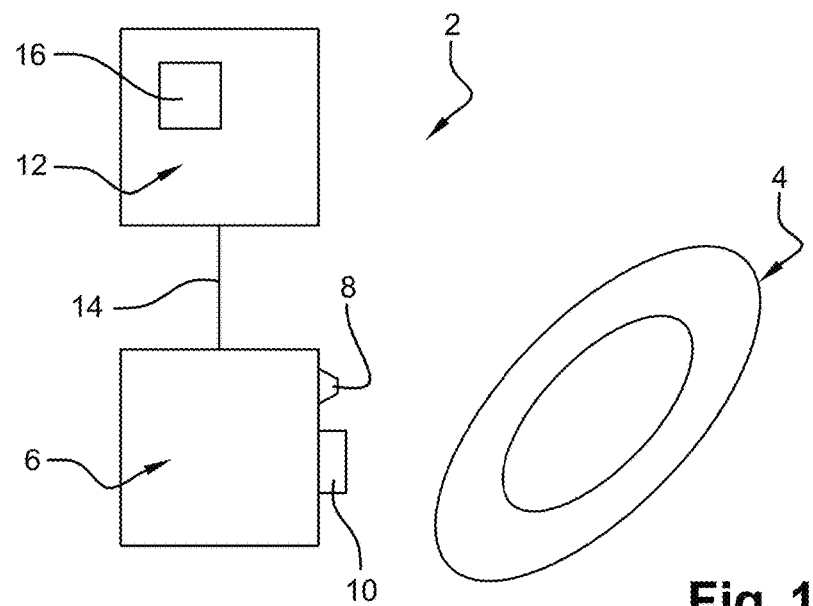
FIG. 1 is a schematic view of an installation for detecting a defect on a surface of a tire according to the invention.

FIG. 1 shows an installation 2 according to the invention. This installation 2 is intended to detect defects on a surface of a tire 4. It is assumed here that the surface in question is an inner surface of the tire 4, but provision may be made for it to be another surface of the tire 4.

The installation 2 comprises automated means 6 adapted for acquiring an image of the surface of the tire 4. The automated acquisition means 6 acquire the image of the surface by laser triangulation, and for this purpose they comprise, notably, a laser source 8 and a sensor 10. Since laser triangulation is a known acquisition method, it will not be detailed further in the following text. Provision may alternatively be made for the image of the surface to be acquired by photometric stereo or by means of what is known as an industrial vision camera.

The installation 2 further comprises automated calculation means 12 connected to the automated acquisition means 6 by a connecting member 14 in such a way that they can exchange data. These automated calculation means 12 comprise, notably, a computer 16. The functions of the automated calculation means 12 will be examined subsequently.

A description will now be given of a method for detecting a defect on the surface of the tire 4 according to the invention, executed by the installation 2, and notably by its automated means 6, 12, using a computer program comprising coded instructions for commanding the execution of the detection method when it is executed by these means. In the present case, the computer program is stored on a storage medium readable by the automated means 6, 12. The computer program is also made available for downloading on a telecommunications network.

Figure 2:
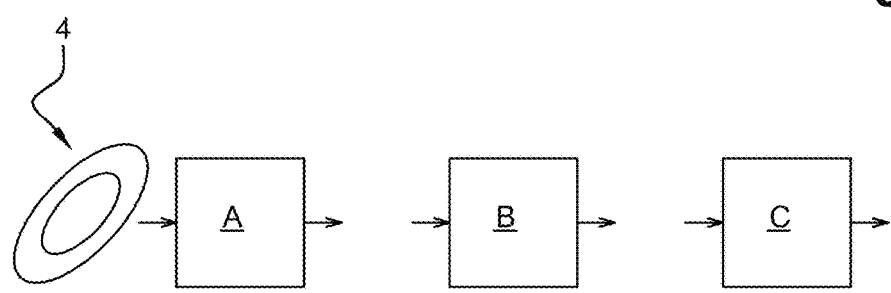
FIG. 2 is a diagram showing the execution of the steps of the method for detecting a defect according to the invention.
Figure 2:

With reference to FIG. 2, in step A, the image of the inner surface of the tire 4 is initially acquired by laser triangulation, using the automated acquisition means 6. In this way, an image 18, called the surface image, is obtained. This surface image 18 is then transmitted to the automated calculation means 12 by means of the connecting member 14. This image is in black and white, and comprises grey levels.

Subsequently, in step B, the automated calculation means 12 calculate values of a texture gradient from the surface image 18, by means of the computer 16. A description will now be given of an algorithm for calculating these values.

A texture parameter is initially selected. In the field of image processing, there is a known way of using one of the following parameters: co-occurrence matrices, Haralick parameters, morphological parameters (such as granulometries by opening and closing), and a local binary pattern (commonly referred to as an LBP, the abbreviation for the English term "Local Binary Pattern"). These parameters all have the common feature of corresponding to spatial statistics on the grey level values of the image. More generally, the calculation of the texture gradient values may be applied to any texture parameter and to any statistic calculated on the image.

In the following text, it will be assumed that the automated calculation means 12 calculate values of a gradient of a plurality of texture parameters in the image of the surface. This number of parameters is denoted n.

Let $F_{i,j}$ be the vector parameters containing the n parameters calculated over a rectangular window having dimensions $W_i \times W_j$ centered on a pixel (i,j) of the surface image 18, assumed to be rectangular and to have the dimensions $S_i \times S_j$.

This vector $F_{i,j}$ is calculated for any pixel (i,j) of the surface image 18, except at its edges, that is to say $$\forall i \in \left[\frac{W_i}{2}, S_i - \frac{W_i}{2}\right] \text{ and } \forall j \in \left[\frac{W_j}{2}, S_j - \frac{W_j}{2}\right].$$

This results in a hypermatrix F with a size of $(S_i-W_i, S_j-W_j, n)$.

Let d be a metric allowing for the distance between two vectors $F_{i,j}$. It should be borne in mind that a metric is a function of $\mathbb{R}^n \times \mathbb{R}^n$ in the set $\mathbb{R}$ which satisfies the following conditions for all $F_{i,j}, F_{k,l}, F_{m,n}$ in $\mathbb{R}^n$:

$d(F_{i,j}, F_{k,l})=0$ if and only if $F_{i,j}=F_{k,l}$
$d(F_{i,j}, F_{k,l})=d(F_{k,l}, F_{i,j})$ (symmetry)
$d(F_{i,j}, F_{m,n}) \leq d(F_{i,j}, F_{k,l})+d(F_{k,l}, F_{m,n})$ (triangle inequality).

The Mahalanobis distance and the $\chi^2$ distance between histograms are examples of metrics. Any metric may be selected. However, certain metrics are more suitable for certain selections of texture parameters. By way of non-limiting examples of embodiment, the following combinations of parameters and metrics yield satisfactory results:

Haralick parameters (vector comprising n=5 texture parameters) in combination with the Euclidean distance, a local binary pattern (vector comprising n=25 texture parameters) in combination with the $\chi^2$ distance between histograms, and a histogram of grey levels created after a sequence of morphological transformations.

The value of the texture gradient at a pixel (i,j) of the surface image 18 for a given translation vector $\vec{t}=(a, b)$ is then the distance, in the direction of the selected metric, between two points of F with a distance of $\vec{t}$ between them, divided by the norm of $\vec{t}$:

$$G_{i,j}^{\vec{t}=(a,b)} = \frac{d\left(F_{i-\frac{a}{2},j-\frac{b}{2}}, F_{i+\frac{a}{2},j+\frac{b}{2}}\right)}{\sqrt{a^2+b^2}}$$

In practice, the automated calculation means 12 calculate the values of two texture gradients, namely a vertical texture gradient $\vec{t}_{vert}=(t_{vert}, 0)$ and a horizontal texture gradient $\vec{t}_{hor}=(0, t_{hor})$. Their norm is then deduced:

$$\|G_{i,j}^{\vec{t}_{vert},\vec{t}_{hor}}\| = \sqrt{\left(G_{i,j}^{\vec{t}_{vert}=(t_{vert},0)}\right)^2 + \left(G_{i,j}^{\vec{t}_{hor}=(0,t_{hor})}\right)^2}$$

The distance values $t_{vert}$ and $t_{hor}$ are selected so that the texture parameter calculation windows do not overlap, i.e. $t_{vert}=W_i$ and $t_{hor}=W_j$.

To optimize the calculation time, the calculation of the gradient values may be carried out, not for each pixel of the original image, but by intervals of $step_i$ pixels vertically and $step_j$ horizontally. In other words, the automated calculation means 12 calculate the values of the texture gradient in a selection of pixels of a part of the image. This is equivalent to performing a decimation on the hypermatrix F. Let $\hat{F}$ be the sub-sample of F:

$$\hat{F}_{i,j} = F_{i \times step_i, j \times step_j}$$

Then, $$\hat{G}_{i,j}^{\vec{t}=(a,b)} = \frac{d\left(\hat{F}_{i-\frac{a}{2step_i},j-\frac{b}{2step_j}}, \hat{F}_{i+\frac{a}{2step_i},j+\frac{b}{2step_j}}\right)}{\sqrt{a^2+b^2}}$$

By way of a non-limiting exemplary embodiment, the parameters may be selected as follows:
$W_i=W_j=40$ pixels,
$t_{vert}=t_{hor}=40$ pixels, et
$step_i=step_j=5$ pixels.

Here, a unitary window size $W_i=W_j=1$ pixel is selected, and the automated calculation means 12 calculate a grey level gradient in the surface image 18 so that G is what is commonly called the gradient of the surface image 18.

The automated calculation means 12 then determine an image of the gradient 20, using the gradient values calculated according to the algorithm described above.

Finally, in step C, the automated calculation means 12 perform a thresholding of the image of the gradient 20, in order to obtain a thresholded image 22. The thresholding is performed by hysteresis. The thresholded image 22 may take the form of a black and white image, also called a binary image. Consequently, this image comprises only two types of pixel, namely black pixels and white pixels.

The automated means 6, 12 of the installation 2 are therefore adapted for:

calculating values of a texture gradient from an image of the surface of the tire 4, determining the image of the gradient 20, and thresholding the image of the gradient, in order to obtain the thresholded image 22.

The thresholded image 22 is then submitted to an operator so that he can view the location of any defects on the inner surface of the tire 4. In the thresholded image 22 shown in FIG. 2, the white area correspond to the regions of the inner surface of the tire 4 with a high gradient, characteristic of the presence of defects, and the black areas correspond to the regions of the surface with a low gradient.

On the basis of the characteristics of any defects, such as their size and number, the operator may decide if action needs to be taken in relation to the tire 4, such as the rejection or destruction of the tire. It may also be specified that the automated calculation means 12 themselves should view the thresholded image 22, and decide whether or not to take action in relation to the tire 4.

Clearly, numerous modifications may be made to the invention without departing from the scope thereof.

Provision may be made to use the installation for detecting a defect on a surface of an article other than a tire.

The invention claimed is:

1. A method for detecting a defect on a surface of a tire, the method comprising:

automatically calculating, using a computer, values of a gradient of a plurality of texture parameters from an image of the surface of the tire;

automatically determining, using the computer, an image of the gradient;

automatically thresholding, using the computer, the image of the gradient to obtain a thresholded image; and displaying the thresholded image, wherein the plurality of texture parameters comprises at least five texture parameters.

2. The method according to claim 1, wherein the image of the surface of the tire is an image of an inner surface of the tire.

3. The method according to claim 1, further comprising using a laser system to automatically acquire the image of the surface of the tire by laser triangulation.

4. The method according to claim 1, wherein the computer calculates the values of the gradient in a selection of pixels of a part of the image of the surface of the tire.

5. The method according to claim 1, further comprising automatically calculating, using the computer, a grey-level gradient in the image of the surface of the tire.

6. The method according to claim 1, wherein the thresholding is performed by the computer using a hysteresis process.

7. The method according to claim 1, wherein the plurality of texture parameters consists of five texture parameters.

8. The method according to claim 1, wherein the plurality of texture parameters comprises Haralick parameters.

9. The method according to claim 1, wherein the plurality of texture parameters comprises a local binary pattern.

10. The method according to claim 1, wherein the plurality of texture parameters comprises 25 texture parameters.

11. A computer-readable storage medium storing a program that when executed by a computer causes the computer to perform a method for detecting a defect on a surface of a tire, wherein the method includes:

automatically calculating values of a gradient of a plurality of texture parameters from an image of the surface of the tire;

automatically determining an image of the gradient;

automatically thresholding the image of the gradient to obtain a thresholded image; and displaying the thresholded image, wherein the plurality of texture parameters comprises at least five texture parameters.

12. A method for detecting a defect on a surface of a tire, the method comprising downloading to a computer, via a telecommunications network, coded instructions that when executed by the computer cause the computer to:

automatically calculate values of a gradient of a plurality of texture parameters from an image of the surface of the tire, automatically determine an image of the gradient, automatically perform a thresholding process on the image of the gradient to obtain a thresholded image, and display the thresholded image, wherein the plurality of texture parameters comprises at least five texture parameters.

13. An installation for detecting a defect on a surface of a tire, the installation comprising a computer programmed to:

automatically calculate values of a gradient of a plurality of texture parameters from an image of the surface of the tire, automatically determine an image of the gradient, automatically perform a thresholding process on the image of the gradient to obtain a thresholded image, and display the thresholded image, wherein the plurality of texture parameters comprises at least five texture parameters.

14. The installation according to claim 13, further comprising a laser system that automatically acquires the image of the surface of the tire.

* * * * *